United States Patent [19]
Bonnet

[11] Patent Number: 5,388,681
[45] Date of Patent: Feb. 14, 1995

[54] INFLATABLE CONVEYOR BELT

[75] Inventor: Henri Bonnet, Atlanta, Ga.

[73] Assignee: United Parcel Service of America, Inc., Atlanta, Ga.

[21] Appl. No.: 963,588

[22] Filed: Oct. 19, 1992

[51] Int. Cl.⁶ .............................................. B65G 37/00
[52] U.S. Cl. ................... 198/365; 198/477.1; 198/802
[58] Field of Search ............ 198/365, 477.1, 802, 198/811, 839

[56] References Cited

U.S. PATENT DOCUMENTS

| | | | |
|---|---|---|---|
| 3,231,066 | 1/1966 | Harrison et al. | 198/365 |
| 3,348,678 | 10/1967 | Flowers | 209/74 |
| 3,756,380 | 9/1973 | Ackroyd et al. | 198/811 |
| 4,461,378 | 7/1984 | Roth | 198/365 |
| 4,982,828 | 1/1991 | Nicolson et al. | 198/365 |
| 4,993,535 | 2/1991 | Scata | 198/365 |
| 5,086,905 | 2/1992 | Polling | 198/365 |

FOREIGN PATENT DOCUMENTS

| | | | |
|---|---|---|---|
| 0374747 | 6/1990 | European Pat. Off. | |
| 1216325 | 4/1960 | France. | |
| 2111693 | 6/1972 | France. | |
| 2466195 | 4/1981 | France. | |
| 1413983 | 11/1975 | United Kingdom. | |
| 0901199 | 2/1982 | U.S.S.R. | 198/365 |
| 1025617 | 6/1983 | U.S.S.R. | 198/365 |
| 1514708 | 10/1989 | U.S.S.R. | |

*Primary Examiner*—Cheryl L. Gastineau
*Attorney, Agent, or Firm*—James A. Drobile; William H. Murray; Robert E. Rosenthal

[57] ABSTRACT

A conveyor belt includes a lower surface and a number of article supporting surfaces, each of which is tiltably attached to the lower surface. Inflatable chambers are defined in the belt, the article supporting surfaces being disposed to tilt upon inflation of the inflatable chambers. An article conveyor system includes a belt having a lower surface and article supporting surfaces tiltably attached to the lower surface, a conveyor bed for supporting the belt during motion along a predetermined path, and an apparatus for selectively introducing pressurized air between the lower surface and each of the article supporting surfaces for tilting the article supporting surfaces, thereby causing an article on the selectively tilted article supporting surfaces to be discharged.

38 Claims, 10 Drawing Sheets

INFLATABLE CONVEYOR BELT

BACKGROUND OF THE INVENTION

This invention pertains to endless belt conveyors and in particular to endless belt conveyors adapted for sortation of articles.

In facilities for the receiving and sorting of articles, particularly parcels, packages, and letters, conveyors of various types are provided as part of the sorting system. If an endless belt type conveyor is provided, there will frequently be provided various destinations or discharge stations for packages along each side of predetermined conveyor belt path. Each discharge station may correspond to a particular zip code, for example. Conventionally, sortation of packages is performed by manually removing packages from the belt and placing the packages onto discharge stations.

There are known side-discharge conveyor systems which use a track, formed into a closed loop, to support and guide a series of connected carriages. A tiltable tray is conventionally mounted on such carriages for tipping to either side at sort locations. Such a system is disclosed, for example, in U.S. Pat. No. 4,982,828, to Nicolson, et al. However, such systems have a number of disadvantages. The initial cost of constructing the track for such a system is very high. In addition, such systems have numerous mechanical parts, which makes the systems prone to breakdowns as a result of wear on such mechanical parts. Such systems, unlike endless-belt conveyor systems, occupy floor space for a return track. As floor space is typically at a premium in sorting facilities, the need for additional space is a disadvantage of such a system.

There are also known side discharge assemblies which include a belt assembly for supporting a flexible belt, and a member provided for local lateral tilting of the belt assembly. Such a conveyor assembly is disclosed, for example, in U.S. Pat. No. 4,461,378, to Roth. Such a system, like the systems employing carriages on a closed loop, requires a substantial initial investment. In addition, such a system has a large number of moving parts, which are prone to breakdown as a result of mechanical wear.

Flexible belts designed for side discharge of bulk materials cannot effectively perform sortation tasks. Furthermore, such belts cannot discharge articles from both sides alternately.

Endless flexible belts have already been installed in numerous existing article sorting facilities. Manual sort techniques are conventionally employed to remove articles from such belts. Consequently, it is desirable to provide an apparatus that provides automatic side discharge with a minimum cost in replacing existing hardware associated with endless-belt assemblies. It is further desirable that such an apparatus not require a carriage or track, and further that the sortation function be carried out by the belt itself.

In any article sorting operation, gentle handling of the articles is important to minimize damage and breakage. Consequently, an apparatus that provide minimum impact of articles is desirable.

It is desirable to minimize the noise of a sortation apparatus, even at high speeds.

It is an object of this invention to provide an endless belt type conveyor apparatus having a sortation capability.

It is a further object of this invention to provide a endless conveyor belt, for use in an article conveying and sorting system, which affords the capability of providing sortation with a minimum of mechanical parts.

It is a further object of this invention to provide a conveyor-belt type article sortation system where all moving parts are incorporated in the belt.

Additional objects and advantages of the invention will become evident from the detailed description of a preferred embodiment which follows.

SUMMARY OF THE INVENTION

A conveyor belt includes a lower surface and more than one article supporting surface. Each of the article supporting surfaces is tiltably attached to the lower surface.

An article sorting and conveying system for conveying an article along a predetermined path and discharging the article to a selected one of a number of destinations on one or both sides of the predetermined path includes a belt, which belt includes a lower surface and more than one article supporting surface, which article supporting surfaces are tiltably attached to the lower surface. The system further includes an apparatus for supporting the belt during motion along the predetermined path, and an apparatus for selectively tilting the article support surfaces, thereby causing an article on the selectively tilted support surface to be discharged to the selected one of the destinations.

A method for sorting an article by conveying the article along a predetermined path and discharging the article to a preselected one of a number of destinations disposed on at least one side of the predetermined path includes the steps of moving a belt in a longitudinal direction along the predetermined path, which belt includes a lower surface and more than one article supporting surface, each of which article supporting surfaces is tiltably attached to the lower surface. The method further includes the step of placing an article on at least one of the article supporting surfaces. The method further include the step of, when the article is disposed adjacent to the preselected destination, tilting an article supporting surface on which the article is placed about a longitudinal axis so as to discharge the article from the belt to the preselected destination.

An article sorting and conveying system includes a substantially horizontal, planar bed, an endless belt supported on the bed, the endless belt including a normally horizontal upper surface for conveying articles, which upper surface includes more than one article supporting surface, and an apparatus for selectively introducing pressurized gas between the bed and the upper surface for selectively tilting each of the article supporting surfaces with respect to the bed.

A method for sorting and conveying articles includes the steps of supporting an endless belt on a substantially horizontal, planar bed, the belt including a normally horizontal upper surface, which upper surface includes more than one article supporting surface, placing an article at a selected location on the upper surface, the article being supported by at least one of the article supporting surfaces, and selectively tilting at least one of the selected article supporting surfaces by introducing pressurized air between the bed and the upper surface.

DETAILED DESCRIPTION OF A PREFERRED EMBODIMENT

Figure 1:
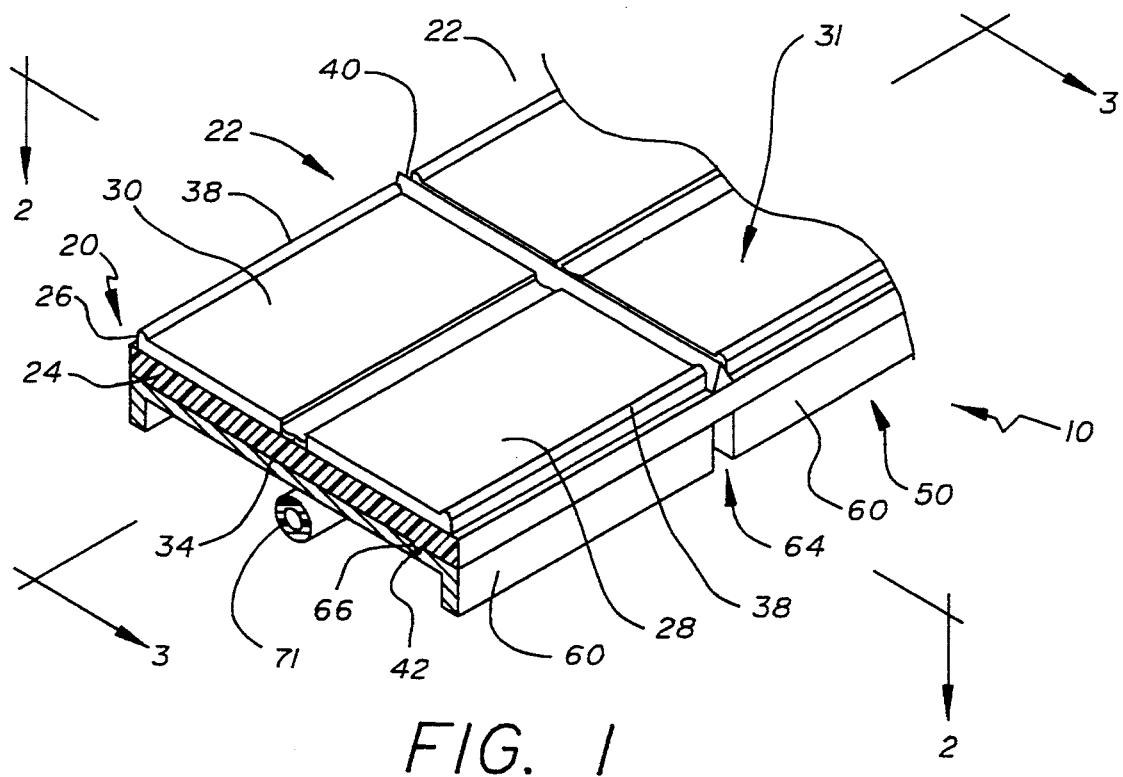
FIG. 1 is a partial isometric view of a system according to the invention.

Referring to FIGS. 1, 2, 3, and 12, there is shown a sorting and conveying system 10 according to the invention. Sorting and conveying system 10 includes belt 20 supported on conveyor belt support apparatus 50, and pressurized fluid or air supply apparatus 70 associated with conveyor belt support apparatus 50.

Belt 20 is generally a continuous or endless flexible belt. Belt 20 is divided along its entire length into a number of sections 22. Upstanding partition fins 40 are disposed transversely across belt 20 at regular spaced intervals to divide belt 20 into sections 22. Each section 22 includes lower surface 24 and upper surface 26. A "surface," as used herein, denotes a material layer in its entirety. Thus a horizontal surface has an upper side and a lower side. Upper surface 26 includes first supporting surface 28, second supporting surface 30, and flexible membrane 34. First supporting surface 28 is disposed toward one edge of upper surface 26, and is connected along its outer edge to an edge of lower surface 24. Second supporting surface 30 is disposed toward an opposite edge of upper surface 26, and is connected along its outer edge to an edge of lower surface 24. In the closed or horizontal position, upper surface 26, including first supporting surface 28 and second supporting surface 30, is supported on lower surface 24. It will be understood that all of first supporting surfaces 28 and second supporting surfaces 30 of belt 20 define normally horizontal upper surface 31.

First supporting surface 28 is connected or attached to lower surface 24 in a generally hinged, tilting, or pivoting manner. First supporting surface 28 is generally pivotable or tiltable with respect to lower surface 24 about an axis in the plane of lower surface 24 and longitudinally extending along the edge of belt 20. Second supporting surface 30 is similarly attached to the opposite edge of lower surface 24, so as to be tiltable or pivotable with respect to lower surface 24 about an axis in the plane of belt 20 and extending longitudinally along an edge of belt 20. As may best be seen in FIG. 12, first edge membrane 25 is attached to an outer edge of lower surface 24 and the outer edge of first supporting surface 28. Similarly, second edge membrane 27 is attached to an opposite outer edge of lower surface 24 and the outer edge of second supporting surface 30. Other structures may be provided so that first supporting surface 28 and second supporting surface 30 will rotate with respect to lower surface 24. Central membrane 34 is attached at its outer edges to the inner edges of first supporting surface 28 and second supporting surface 30. Central membrane 34 may comprise any one of a number of flexible sheet materials which are generally impermeable to air. End membranes 44 are provided substantially at each end of section 22. Each end membrane 44 is attached at a lower edge thereof to lower surface 24, along a top edge to central membrane 34, and along generally diagonal edges disposed intermediate its top and lower edges to first supporting surface 28 and second supporting surface 30. Each of first supporting surface 28 and second supporting surface 30 may optionally have upstanding retaining lips 38 provided along an outer edge thereof. Supporting surfaces 28 and 30 are generally rigid.

Lower surface 24 has, substantially in the center thereof, a circular opening 36. A V-tracking member 42 depends downward from a lower side of lower surface 24 and extends longitudinally along the length of belt 20.

Upper surface 26, lower surface 24, and end membranes 44 define an inflatable chamber 32. Inflatable chamber 32 has generally airtight walls, with a single opening or aperture 36 defined therein.

Conveyor belt support apparatus 50 will now be described. Conveyor belt support apparatus 50 serves to support and guide belt 20. Belt 20 accordingly moves along a predetermined path. Conveyor belt support apparatus 50 comprises a substantially planar, horizontal, elongated bed 52. Conveyor belt support apparatus 50 comprises a plurality of slider bed sections 60. Each slider bed section 60 is preferably a generally planar piece of sheet metal or other material having a smooth surface on which belt 20 may ride with a minimum of friction and a minimum of noise. Each slider bed section 60 is supported on a conventional support apparatus or frame, which is not shown here. Each slider bed section 60 has opening 62 therein. Opening 62 is substantially equidistant from each side of slider bed section 60. Each opening 62 is aligned in the transverse direction with openings 36 in lower surface 24 of section 22 of belt 20. The diameter of openings 62 in the transverse direction is substantially the same as the diameter of opening 36. The diameter of openings 62 in the longitudinal direction is greater than the diameter of openings 36. By way of example, the diameter of openings 62 in the longitudinal direction may be three to four times the diameter of opening 36. Preferably, between each pair of adjacent slider bed sections 60, there is defined a gap 64. Thus two sets of alternating openings, openings 62 and gaps 64, are formed in conveyor bed 52.

Pressurized air supply apparatus 70 will now be described. There is provided a pressurized air plenum 71 disposed beneath conveyor bed 52 longitudinally along the conveyor system 10. There are disposed at selected intervals ports 72. Each port 72 is in physical communication with plenum 70 through one of solenoid-actuated valves 74. Each port 72 has an elongated upward opening having a diameter in the transverse direction generally equal to the diameter of opening 36 in lower surface 24 of section 22 of belt 20. The diameter of port 72 in the longitudinal direction is greater than its diameter in the transverse direction so that physical communication is established between port 72 and inflatable chamber 32 in the interior of section 22 for a desired period of time during the motion of belt 20. There is desirably provided a felt ring 76, disposed on a spring-loaded sleeve 78, which is provided about the edge of the lip of port 72. Spring-loaded sleeve 78 causes felt ring 76 to be biased upward and maintained in physical contact with a lower surface of lower surface 24. This provides a better seal between port 72 and lower surface 24, so that air will not tend to escape between port 72 and lower surface 24, when the air in port 72 is pressurized by opening of valve 74. Felt ring 76 also minimizes wear on the lower side of lower surface 24, thereby providing greater belt life.

Figure 4:
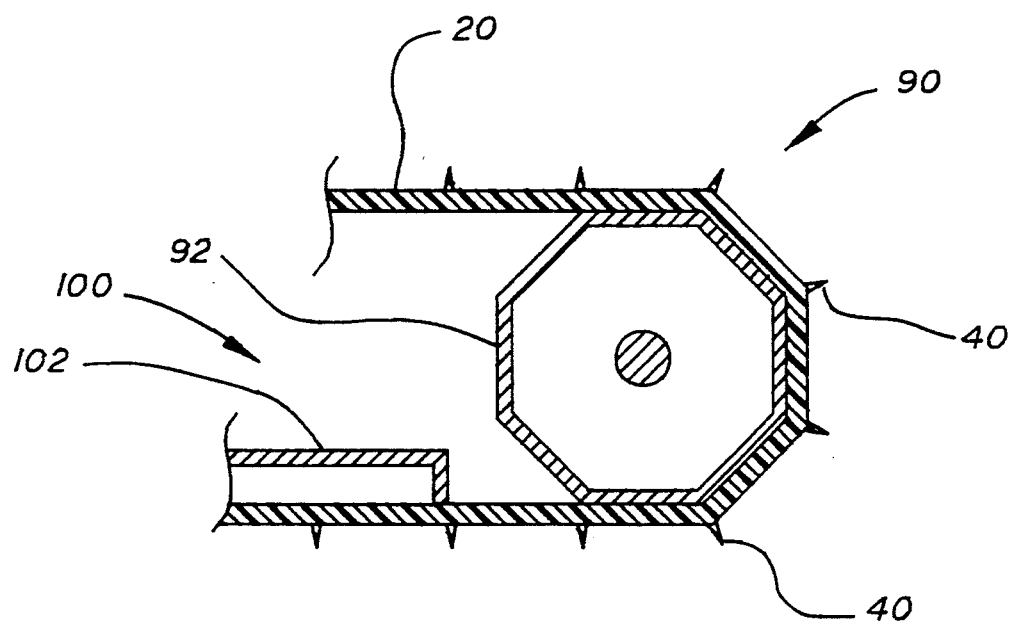
FIG. 4 is a partial sectional view showing further details of a system according to the embodiment of FIG. 1.
Figure 5:
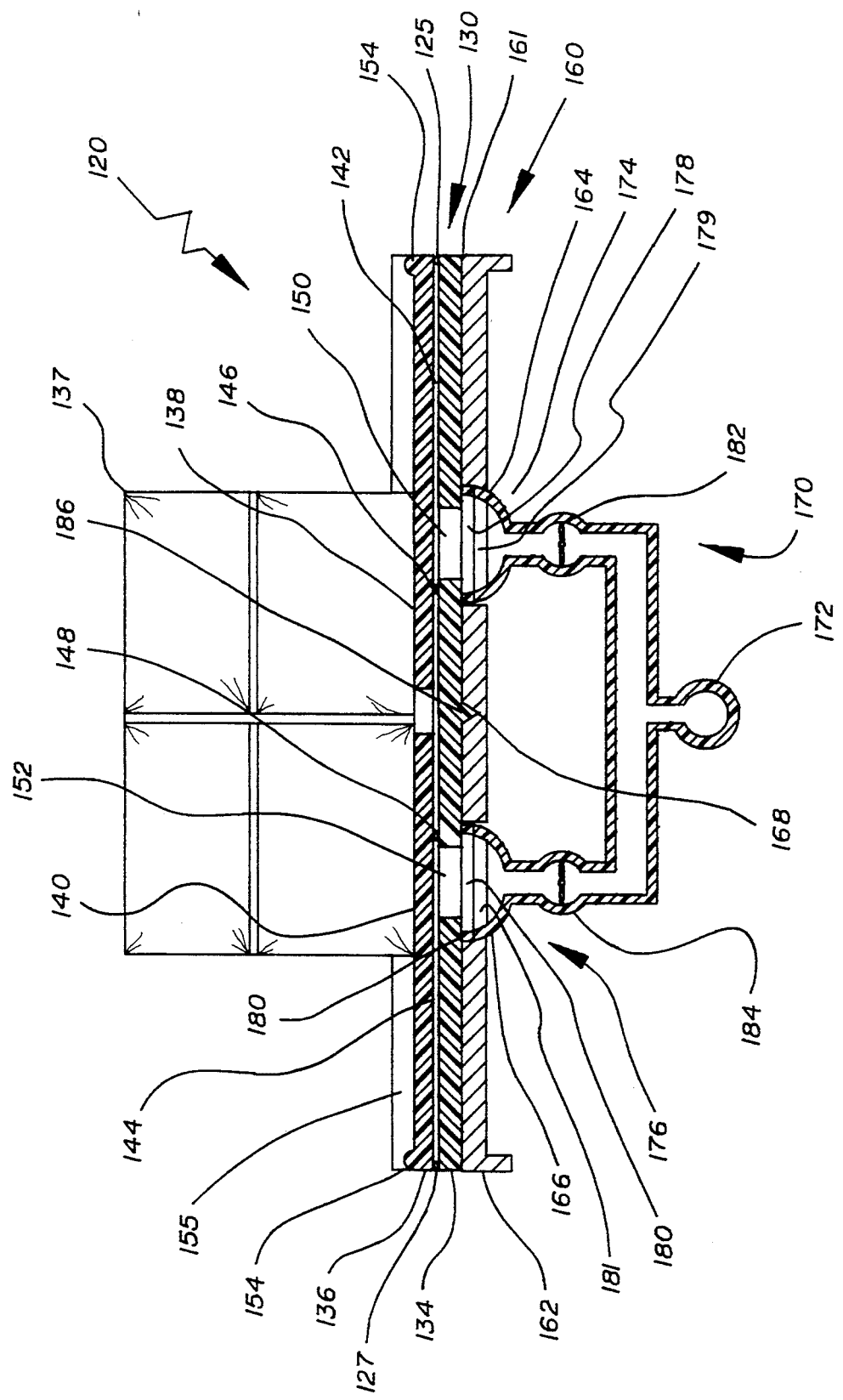
FIG. 5 is a sectional view of a system according to an alternative embodiment of the invention.

With reference to FIG. 4, additional features of a conveying and sorting system 10 according to the embodiment of FIG. 1 will now be described. FIG. 4 depicts in cross-section apparatus 90 for imparting motion to belt 20. Apparatus 90 is a pulley comprising a generally polygonal drum, mounted to rotate about its axis, having a number of flat sides 92. In the embodiment shown, pulley 90 comprises eight flat sides 92. Each flat side 92 has a width equal to the length of each section 22 of belt 20. It is desirable to provide pulley 90 having flat sides 92, as supporting surfaces 28 and 30 are generally rigid. As a result, each section 22 of belt 20 has only limited flexibility.

Continuing to refer to FIG. 4, there is provided along a return path 100 of belt 20 a low-pressure vacuum plenum 102. Vacuum plenum 102 has a continuous longitudinal opening or slot 104 in a lower side thereof, which is maintained, by air pressure, in contact with a normally lower side of lower surface 24. Low-pressure or vacuum plenum 102 is thereby maintained, through openings 36, in physical communication with each inflatable chamber 32 in belt 20. The pressure in plenum 102 is maintained sufficiently low that inflatable chambers 32 are maintained in a deflated condition. If vacuum plenum 102 were not provided, each supporting surface 28, 30, would hang downward. This would require additional vertical height on return path 100, as well as cause wear on central membrane 34 and end membranes 44. This configuration permits a relatively small height to be employed in providing return path 100 for belt 20, and tends to reduce wear on central membrane 34 and end membranes 44. Alternatively, a roller bed or low-friction bed may be provided for the return path for belt 20.

Figure 10:
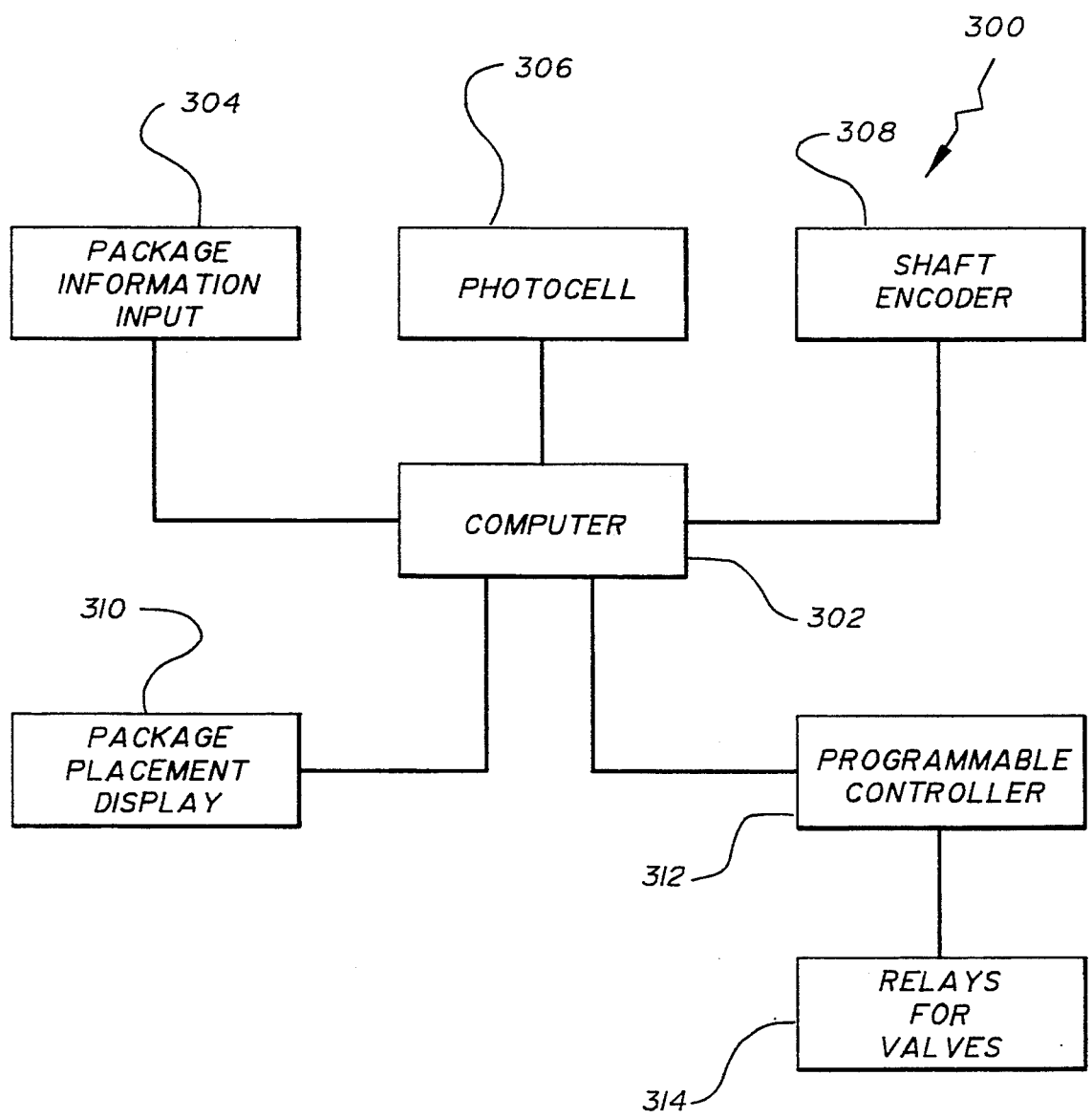
FIG. 10 is a schematic view of a control apparatus of a conveyor system according to the invention.
Figure 12:
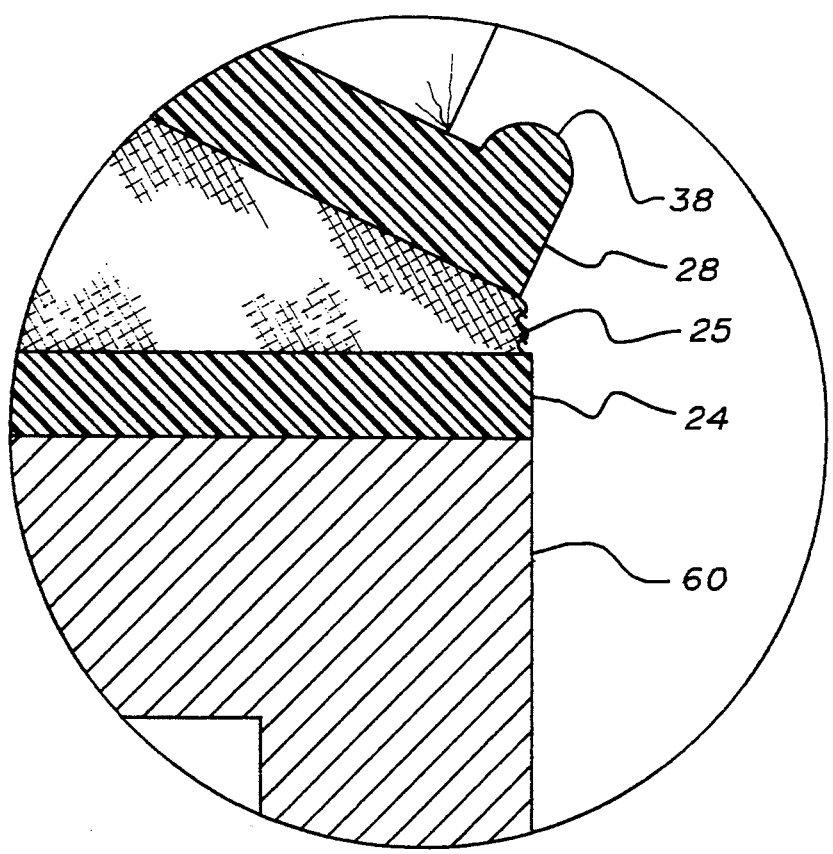
FIG. 12 is a partial enlargement of FIG. 2.

Referring now to FIG. 10, there is depicted a control system for an apparatus according to the invention. Control system 300 is shown. Computer 302 is connected to and receives information from package information input 304, photocell 306, and shaft encoder 308. Package information input 304 may be any one of a large number of devices for receiving package information. For example, a keyboard may be provided in which an operator inputs the zip code, or identifying information, of each package. Alternatively, an automated label reading apparatus may be provided, which sends a signal containing package information to the computer.

Figure 11:
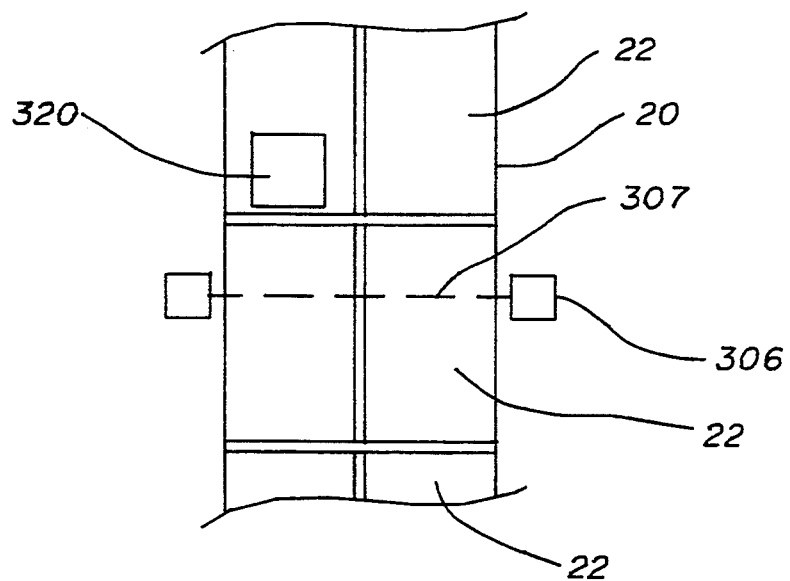
FIG. 11 is a partially schematic partial top view of an apparatus according to the invention.

Referring to FIG. 11, which is a partially schematic partial top view of an apparatus according to the invention, photocell 306 is provided downstream of the point where a package, shown at 320, is placed on belt 20 according to the invention. Photocell 306 sends a signal, when its beam 307 is broken, to computer 302 that the package is passing the point on the belt where the photocell is located at a particular time.

Referring again to FIG. 10, shaft encoder 308 is desirably attached to a drive pulley, such as drive pulley 90, or other pulley, on which the belt according to the invention is mounted. By suitable calibration, shaft encoder 308 may monitor the motion of the pulley, which may be correlated to motion of the belt.

Computer 302 is electrically connected to and provides output to package placement signal apparatus 310 and programmable controller 312. Computer 302 coordinates each package with its destination information. Computer 302 determines, in the embodiment according to FIG. 1, whether each package is to be discharged to the right side or the left side of the belt. Computer 302 then provides a package placement signal in accordance with the discharge side. If packages are being manually loaded on the belt, a right-hand light and a left-hand light may be provided, to provide a visual signal for an operator to place a package on one side or the other of the belt. If an automated loader is being used, which may be biased to either side of the belt, then the package placement signal is sent to the control apparatus for such an automated unloading apparatus.

Programmable controller 312 controls relays 314 for all of the solenoid-actuated valves disposed in the air supply system according to the various embodiments of the invention. Computer 302 sends a signal, at a selected time, for a selected valve to be opened. Programmable controller 312 then sends a signal to the appropriate relay among relays 314 to open for a selected period of time.

The operation of conveying and sorting system 10, according to FIGS. 1, 2, 3, and 12 and using control system 300 of FIG. 10, will now be described. Label or destination information from a package is input at package information input 304. The label information is electronically transmitted to computer 302 from package information input 304. Computer 302 identifies, based on information received from package information input 304, and stored destination data, such as a look-up table, to which one of the destinations along the predetermined path on which belt 20 moves, the package is to be discharged. Each such destination is located on either the left or the right side of the predetermined path. Computer 302 provides a signal to package placement display 310 indicative of whether the identified destination is on the right or the left side. Package placement display 310 then displays a signal indicating to a manual belt loader whether the package is to be placed on the left or the right side of the belt.

In accordance with the signal provided by package placement display 310, the package is placed at a selected location on upper surface 31 of belt 20. Specifically, the package is placed on a first supporting surface 28 or a second supporting surface 30, on a section 22. As the package is carried along by belt 20, a photo switch is tripped, thereby causing photocell 306 to provide a signal to computer 302. Computer 302 thereby knows the position of the package on the belt 20 at the time the photoswitch is tripped. Shaft encoder 308 provides a signal reflecting the change in position of a drive pulley, or of a follower. By suitable software, computer 302 can monitor the motion of the package. The package is prevented from moving between sections 22 by upstanding fins 40. Retaining lip 38 prevents the package from falling off the edge of belt 20.

When computer 302 determines that the package has reached, or is a preselected number of pulses or distance before, the selected discharge location, computer 302 sends a signal to programmable controller 312. The signal to programmable controller 312 identifies the destination. Programmable controller 312, upon receiving the signal from computer 302, sends a signal to the appropriate relay to open one of the valves.

The relay then opens valve 74. This causes pressurized air from plenum 70 to enter port 72. When opening 36 in lower surface 24 is situated over port 72, and only when opening 36 is so situated, pressurized air enters inflatable chamber 32 and causes inflatable chamber 32 to inflate. In other words, pressurized air supply apparatus 70 introduces pressurized air between lower surface 24 and first article supporting surface 28 and second article support surface 30, or between conveyor bed 52 and first and second article supporting surfaces 28 and 30.

Figure 2:
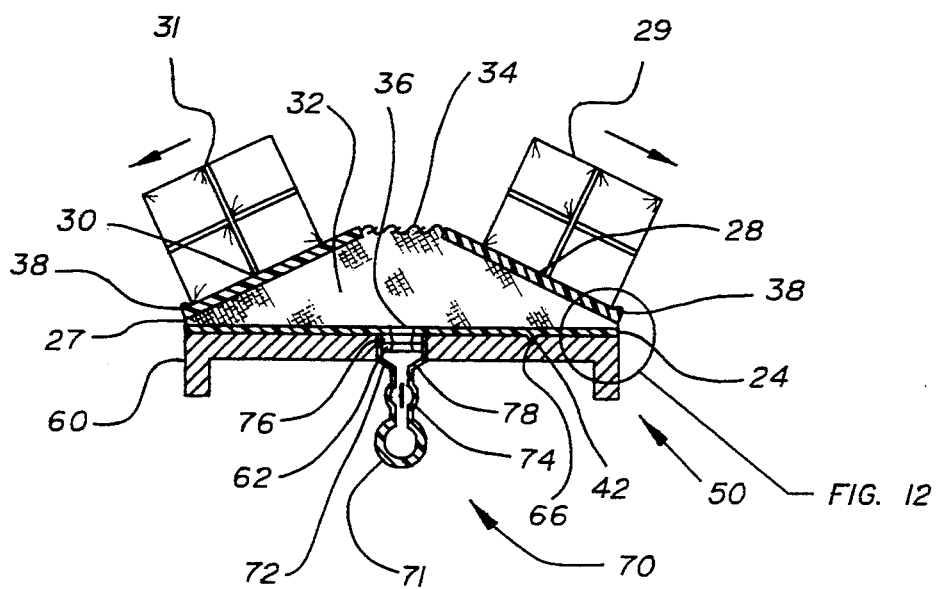
FIG. 2 is a sectional view, taking along line 2—2 of FIG. 1, of a belt according to the embodiment of FIG. 1, showing the belt in an inflated position.
Figure 3:
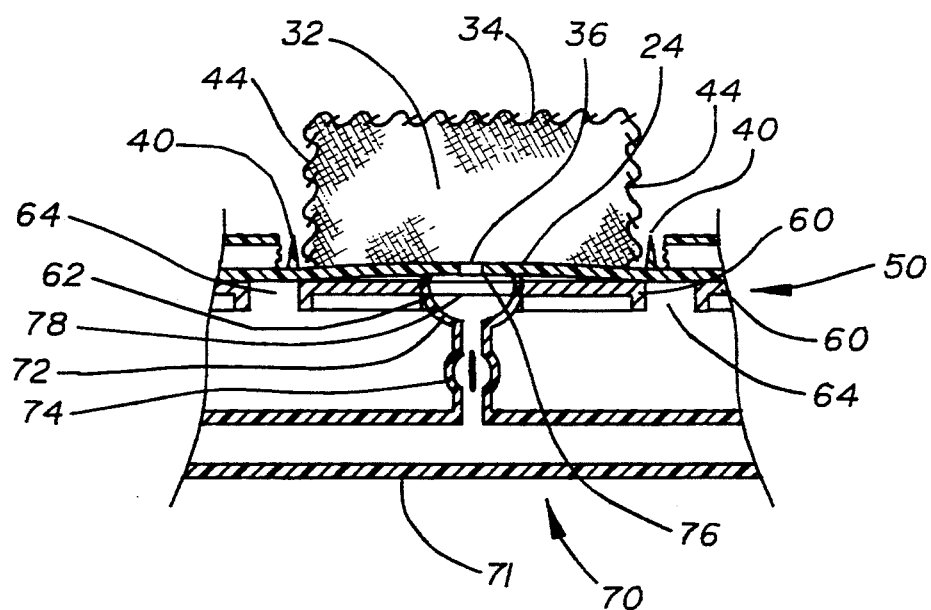
FIG. 3 is a partial sectional view, taking along line 3—3 of FIG. 1, of a system according to the embodiment of FIG. 1.

As shown in FIG. 2, the introduction of pressurized air causes first supporting surface 28 to tilt about its longitudinal axis at a first side of belt 20, or to tilt to a first side of belt 20, and second supporting surface 30 to tilt about its longitudinal axis at a second side of belt 20, or to tilt to a second side of belt 20. First supporting surface 28 and second supporting surface 30 are fully tilted, and inflatable chamber 32 is fully inflated when end membranes 44 and central membrane 34 are pulled taut. The angle between first supporting surface 28, or second supporting surface 30, and lower surface 24, when the supporting surfaces are tilted, may be adjusted by suitably changing the dimensions of end membranes 44 and central membrane 34. The angle between supporting surfaces 28, 30, and lower wall 24, may be, for example, about 30 degrees. It will be understood that first supporting surface 28 and second supporting surface 30 tilt with respect to both lower wall 24 and conveyor bed 52.

If the package is disposed on first supporting surface 28, then the package slides to the first side of belt 20, over retaining lip 38, to the selected destination. In FIG. 2, package 29 is depicted sliding to the first side of belt 20 and will proceed over retaining lip 38. If the package is disposed on second supporting surface 30, then the package slides to the second side of belt 20, over retaining lip 38, to a selected destination on the second side of belt 20. In FIG. 2, package 31 is depicted sliding to the second side of belt 20 and will proceed over retaining lip 38. Opening 36 remains disposed over port 72 for a period of time determined by the length of port 72 and the speed of belt 20. The elongation of port 72 in the longitudinal direction causes physical communication between inflatable chamber 32 and port 72 to be maintained for a longer period of time than if port 72 had a smaller diameter in the longitudinal direction. Accordingly, communication will be maintained for a sufficient period of time to achieve full tilting of article supporting surfaces 28 and 30, and to maintain article supporting surfaces 28 and 30 in a fully tilted orientation for a period of time sufficient to ensure discharge of the package.

The continuous motion of belt 20 brings opening 36 over gap 64. Gap 64 causes inflatable chamber 32 to be provided in physical communication with atmospheric air. Inflatable chamber 32 quickly deflates, and first supporting surface 28 and second supporting surface 30 return from the tilted orientation to their normal horizontal position.

Referring to FIGS. 5, 6, 6A, and 7, there will be described a conveying and sorting system 120 according to an alternative embodiment of the invention. Conveying and sorting system 120 includes belt 130, belt support 160, and air supply system 170. Belt 130 is divided into sections 132 along its entire length. As with the embodiment of FIG. 1, upwardly-projecting partition fins 155 are provided transversely at spaced intervals between adjacent sections 132 across upper surface of belt 130 to prevent packages from sliding between adjacent sections 132. Each section 132 includes lower surface 134 and upper surface 136. Box 137 is depicted disposed centrally on upper surface 136. Upper surface 136 includes first supporting surface 138 and second supporting surface 140. First supporting surfaces 138 and second supporting surfaces 140 of sections 132 of belt 130 define a normally horizontal upper surface 141 of belt 130.

First supporting surface 138 and second supporting surface 140 are generally rigid, planar members. First supporting surface 138 is attached along an outer edge thereof, to an outer edge of lower surface 134. The attachment between first supporting surface 138 and lower surface 134 is so provided that first supporting surface 138 is generally hinged, tiltable, or rotatable about a longitudinal axis along an edge of belt 130. Similarly, second supporting surface 140 is generally hingedly, rotatably, or tiltably attached to an opposite outer edge of lower surface 134. First edge membrane 125 is attached to an outer edge of lower surface 134 and the outer edge of first supporting surface 138. First edge membrane 125 thus provides the hinged attachment between lower surface 134 and first supporting surface 138. Similarly, second edge membrane 127 is attached to an opposite outer edge of lower surface 134 and the outer edge of second supporting surface 140. Second edge membrane 127 thus provides the hinged attachment between lower surface 134 and second supporting surface 140. First supporting surface 138 and second supporting surface 140 are thus each rotatably movable with respect to lower surface 134 about a longitudinal axis along an edge of belt 130.

Figure 7:
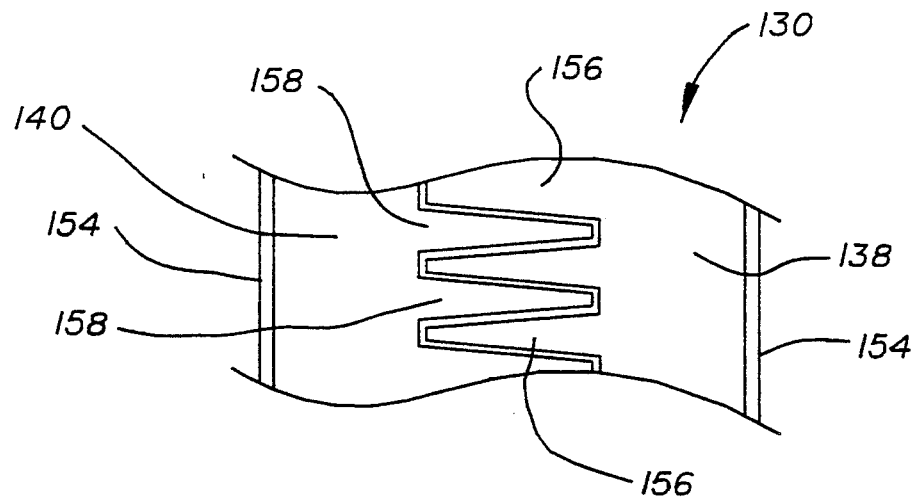
FIG. 7 is a top view of a system according to the embodiment of FIG. 5.

Referring now to FIG. 7, it will be seen that first supporting surface 138 comprises a plurality of spaced fingers 156 extending transversely toward an opposite side of belt 130 from the side where first supporting surface 138 is attached to lower surface 134. Similarly, second supporting surface 140 has provided thereon a plurality of spaced fingers 158 extending transversely toward a side of belt 130 opposite to that side where second supporting surface 140 is attached to lower surface 134. Fingers 156 on first supporting surface 138 and fingers 158 on second supporting surface 140 are disposed in alternating arrangement, whereby a central portion 159 of upper surface 141 of belt 130 is defined. Any article on central portion 159 of upper surface 141 of belt 130 will thus be supported by both first supporting surface 138 and second supporting surface 140. First supporting surface 138 and second supporting surface 140 may each optionally have provided projecting upwardly therefrom at an outer edge thereof retaining lips 154.

First membrane 146 is provided in a generally vertical, longitudinal orientation, attached along an upper edge thereof to a lower surface of first supporting surface 138 and along a lower edge thereof to an upper surface of lower wall 134. Similarly, second membrane 148 is provided in a generally vertical, longitudinal, orientation, an upper edge thereof being attached to a lower side of second supporting surface 140 and a lower edge thereof being attached to an upper side of lower surface 134.

First end membranes 147 are provided in a generally vertical, transverse orientation and are each attached along a generally outer and upper edge thereof to first supporting surface 138 near the respective ends thereof. First end membranes 147 are each attached along an inner side thereof to the respective ends of first membrane 146. First end membranes 147 are each attached along a lower edge thereof to an upper side of lower surface 134. Similarly, each of second end membranes 149 is provided in a generally vertical, transverse orientation, attached along an outer and upper edge thereof to second supporting surface 140 near the respective ends thereof. An inner edge of each of second end membranes 149 is attached to one of the respective ends of second membrane 148. A lower edge of each of second end membranes 149 is attached to an upper side of lower surface 134.

A portion of lower surface 134 outward of first membrane 146, a portion of first supporting surface 138 outward of first membrane 146, first membrane 146, and first end membranes 147, define first inflatable chamber 142 disposed between lower surface 134 and upper surface 136. Similarly, a portion of lower surface 134 outward of second membrane 148, a portion of second supporting surface 140 outward of second membrane 148, second membrane 148, and second end membranes 149, define second inflatable chamber 144 disposed between lower surface 134 and upper surface 136. First opening 150 is defined in first inflatable chamber 142. First opening 150 is a circular opening through lower surface 134. Second opening 152 is defined in second inflatable chamber 144. Second opening 152 is a circular opening through lower surface 134. A V-tracking member 186 may optionally be provided depending downward from a central portion of lower surface 134 and extended longitudinally along belt 130.

Conveyor belt support apparatus 160 will now be described. Conveyor belt support apparatus 160 serves to support and guide belt 130 along a predetermined path. Conveyor belt support apparatus 160 comprises a substantially planar, horizontal, elongated bed 161. Conveyor belt support apparatus 160 preferably comprises a plurality of slider bed sections 162 disposed in end-to-end relation along the length of conveyor belt support apparatus 160. Each slider bed section 162 is preferably a generally planar piece of sheet metal or other material having a smooth surface on which belt 130 may ride with a minimum of friction. Each slider bed section 162 is supported on a conventional support apparatus or frame, which is not shown here. Each slider bed section 162 has first opening 164 and second opening 166 defined therein. First opening 164 and second opening 166 are disposed spaced transversely inward from opposite sides of slider bed section 162.

First opening 164 and second opening 166 are aligned in a transverse direction with first opening 150 and second opening 152 in lower surface 134 of belt 130. The diameter of first opening 164 and second opening 166 in slider bed 162 in the transverse direction is substantially the same as the diameter of first opening 150 and second opening 152 in lower surface 134 of belt 130. The diameter of first opening 164 and second opening 166 in slider bed section 162 in the longitudinal direction is greater than the diameter of openings 150 and 152, and may be three to four times the diameter of openings 150 and 152. Preferably, between each pair of adjacent slider bed sections 162 there is defined a gap 163. Thus, first openings 164 and second openings 166, alternating with gaps 163, are formed in conveyor bed 161. V-tracking groove 168 is provided longitudinally in the center of each slider bed section 162 aligned with and dimensioned to receive V-tracking member 186.

Pressurized gas or air supply system 170 will now be described. There is provided a pressurized air plenum 172 extending longitudinally beneath conveyor bed 161. There are disposed at selected intervals pairs of transversely aligned ports, each pair including first port 174 and second port 176. First port 174 is in physical communication with plenum 172 through first solenoid-actuated valve 182. Second port 176 is in physical communication with plenum 172 through second solenoid-actuated valve 184. Each of first port 174 and second port 176 has an elongated upward opening having a diameter in the transverse direction generally equal to the diameter of first opening 150 and second opening 152 in lower surface 134 of belt 130. The diameter of each of first port 174 and second port 176 in the longitudinal direction is greater than the diameter of first opening 150 and second opening 152. The diameter of first port 174 and second port 176 in the longitudinal direction may be three to four times the diameter of first opening 150 and second opening 152. This configuration of first port 174 and second port 176 provides physical communication between first port 174 and first inflatable chamber 142, and second port 176 and second inflatable chamber 144, for a desired period of time during the longitudinal motion of belt 130.

As with the embodiment of FIG. 1, there is desirably provided a first felt ring 178 on first port 174, and a second felt ring 180 on second port 176. Each felt ring 178, 180 is disposed on a spring-loaded sleeve 179, 181 which is provided about the lip of respective ports 174,176. Spring-loaded sleeves 179, 181 cause each felt ring 178, 180 to be biased upward and thereby maintained in physical contact with a lower surface of lower wall 134. This provides a better seal between the respective ports 174, 176 and lower surface 134, so that a minimum of pressurized air will leak when the air in first port 174 is pressurized by opening of the first valve 182, and air in second port 176 is pressurized by opening of second valve 184. As a result, air will be forced into first inflatable chamber 142 from first port 174, or into second inflatable chamber 144, from second port 176, with a minimum of leakage in any gap between first port 174, or second port 176, and lower surface 134. Felt rings 178, 180 also minimize wear on the lower side of lower surface 134, thereby providing extended belt life.

The control apparatus 300 of FIG. 10 may be used to control the operation of conveyor system 120, except that package placement display 310 is not necessary. The package may simply be placed so that its center of gravity is over central portion 159 of section 132. However, package placement display 310 may be used in addition, so that packages can be placed to one side or the other of belt 122, if desired. As explained above, computer 302, using information received from package information input 304, selects a destination. Using information from photo-cell 306 and shaft encoder 308, computer 302 monitors the position of the package. When the package reaches a selected location, computer 302 provides a signal to programmable controller 312, which in turn provides a signal to the appropriate one of relays 314, thereby causing a selected valve to be opened.

Figure 6:
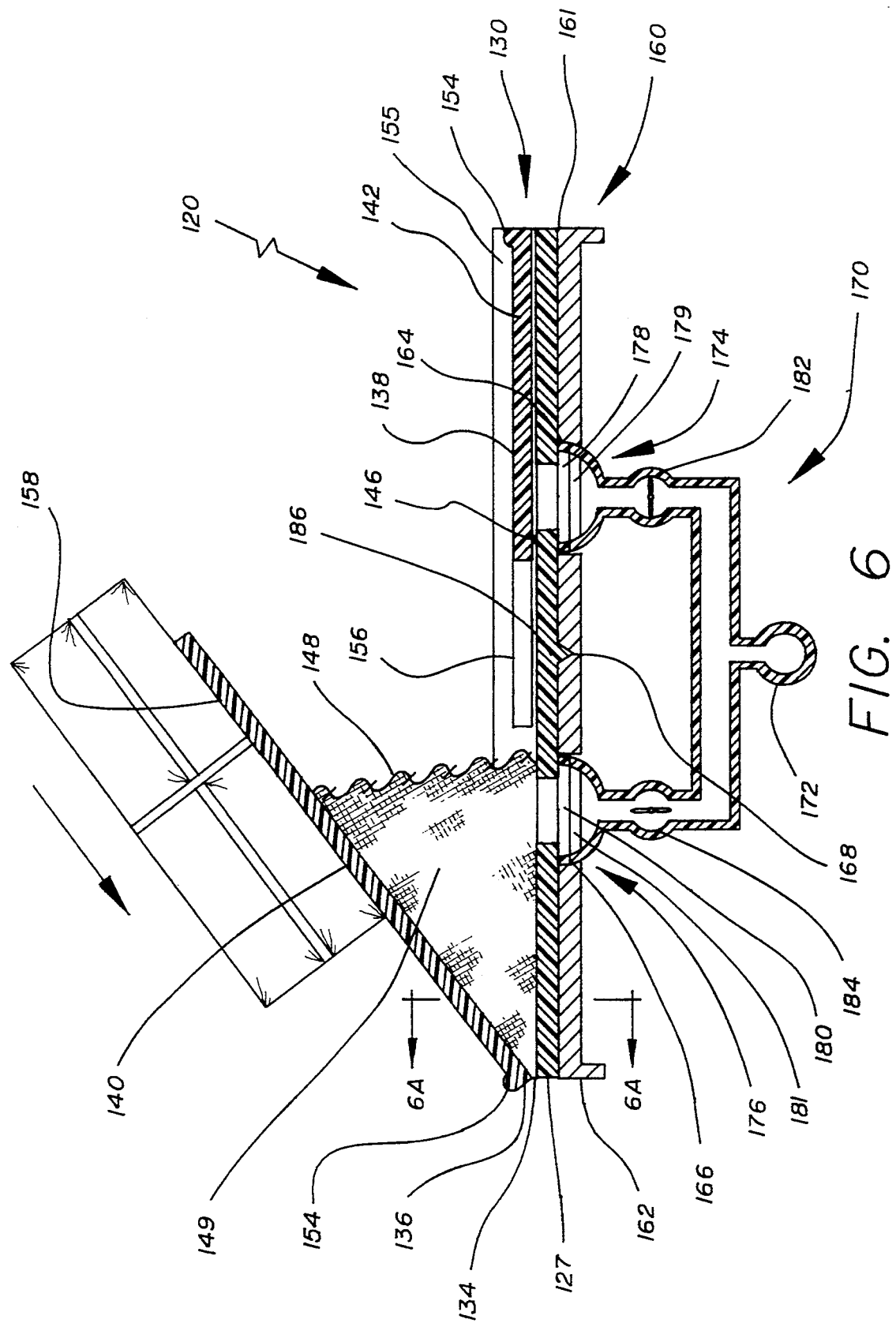
FIG. 6 is a sectional view, similar to FIG. 5, showing the embodiment of FIG. 5, with the belt in an inflated position.
Figure 6A:
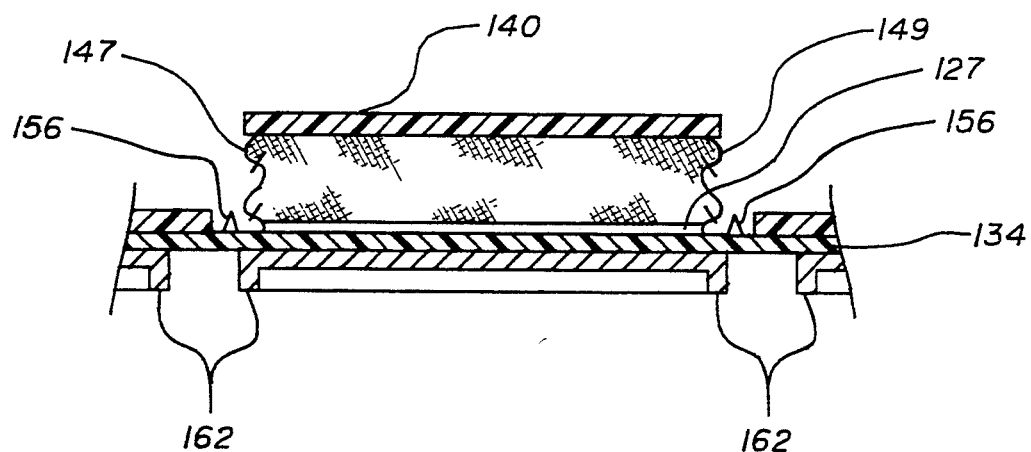
FIG. 6A is a partial sectional view, taken along lines 6A—6A of FIG. 6, of a system according to the embodiment of FIG. 5.

As may be understood with reference to FIG. 6, when second valve 184 is opened while second opening 152 is disposed over second port 176, second inflatable chamber 144 is caused to expand by filling with pressurized air from pressurized air plenum 172. In other words, air supply system 170 introduces pressurized air between second supporting surface 140 and lower surface 134, or between second supporting surface 140 and conveyor bed 151. Second supporting surface 140 is thereby forced upward until second membrane 148 is substantially taut. By admitting pressurized air from plenum 172 into second inflatable chamber 144, second supporting surface 140 is tilted with respect to lower surface 134 and conveyor bed 161. When second supporting surface 140 is fully tilted, the angle between second supporting surface 140 and lower surface 134 may be about 30 degrees. It will be understood that second supporting surface 140 and second inflatable chamber 144 are so disposed with respect to one another that inflation of second inflatable chamber 144 causes second supporting surface 140 to tilt to the left side of belt 130. This is accomplished in this embodiment by providing a pivotal connection at the left side of belt 130 between lower surface 134 and second supporting surface 140, and by providing second inflatable chamber 144 inward of the pivotal connection. Similarly, first supporting surface 138 is so disposed with respect to first inflatable chamber 142 that inflation of first inflatable chamber 142 causes first supporting surface 138 to tilt to the right side of belt 130. This is accomplished in this embodiment by providing a pivotal connection at the right side of belt 130 between lower surface 134 and first supporting surface 140, and by providing first inflatable chamber 142 inward of the pivotal connection. When first supporting surface 138 is fully tilted, the angle between first supporting surface 138 and lower surface 134 may be about 30 degrees. It will be understood that other configurations of supporting surfaces with respect to inflatable chambers may be provided for selectively causing tilting of either one or the other supporting surface, depending on which chamber is inflated. Any package that is supported on second supporting surface 140 will thereby be discharged to the left side of belt 130 in FIG. 6. This is illustrated by box 137, which is sliding in the direction of the arrow in FIG. 6. As fingers 158 of second supporting surface 140 are disposed across central portion 159 of section 132, any package located in central portion 159 will be discharged to the left side.

It will be understood that by opening valve 182, rather than valve 184, first inflatable chamber 142 will be inflated. In other words, air supply system 170 introduces pressurized air between first supporting surface 138 and lower surface 134, or between first supporting surface 138 and conveyor bed 161. As a result, first supporting surface 138 is caused to tilt with respect to lower surface 134 and conveyor bed 161, and any package located in central portion 159 of conveyor section 132 is discharged to the right side. Thus, by selectively opening one of valves 182 and 184, a package disposed in the central portion 159, or more precisely, with its center of gravity over central portion 159 of section 132, may be discharged to either side of belt 130.

The continuing motion of belt 130 brings first opening 150 and second opening 152 over gap 163. Gap 163 causes both inflatable chambers 142, 144 to be provided in physical communication with atmospheric air. Whichever one of inflatable chambers 142, 144 is inflated, quickly deflates, and the tilted one of supporting surfaces 138, 140, quickly returns from its tilted orientation to its normal horizontal orientation.

Figure 9A:
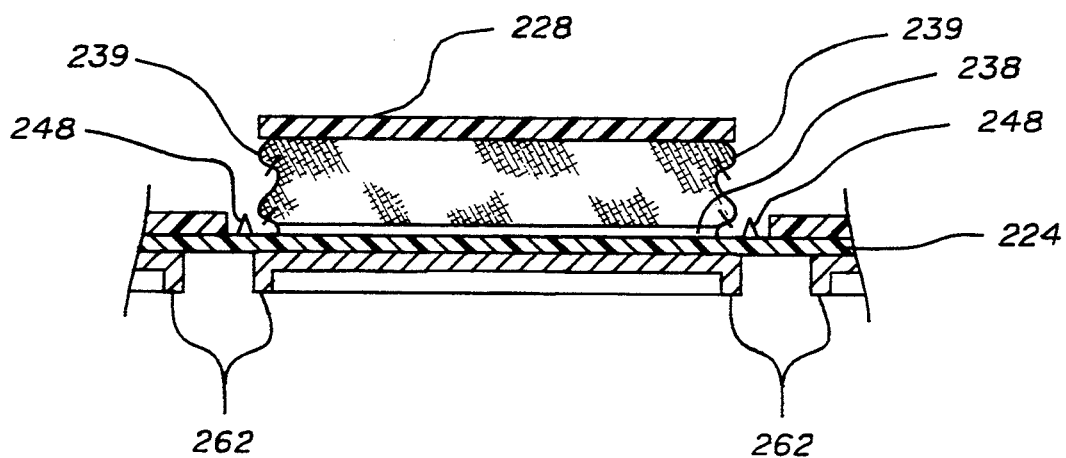
FIG. 9A is a sectional view, taken along line 9A—9A of FIG. 9, of a system according to the embodiment of FIG. 8.
Figure 8:
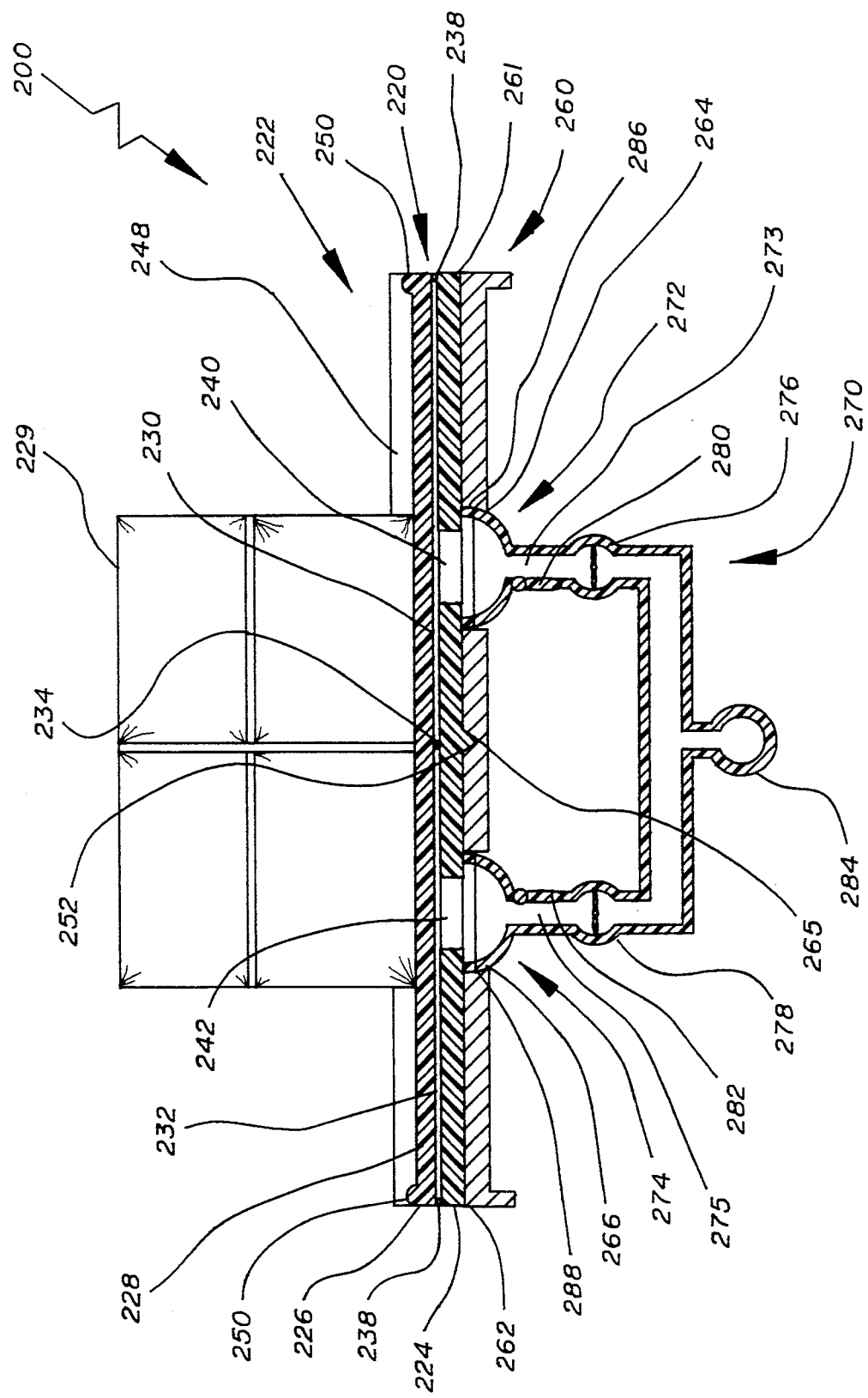
FIG. 8 is a sectional view of a system according to an alternative embodiment of the invention.
Figure 9:
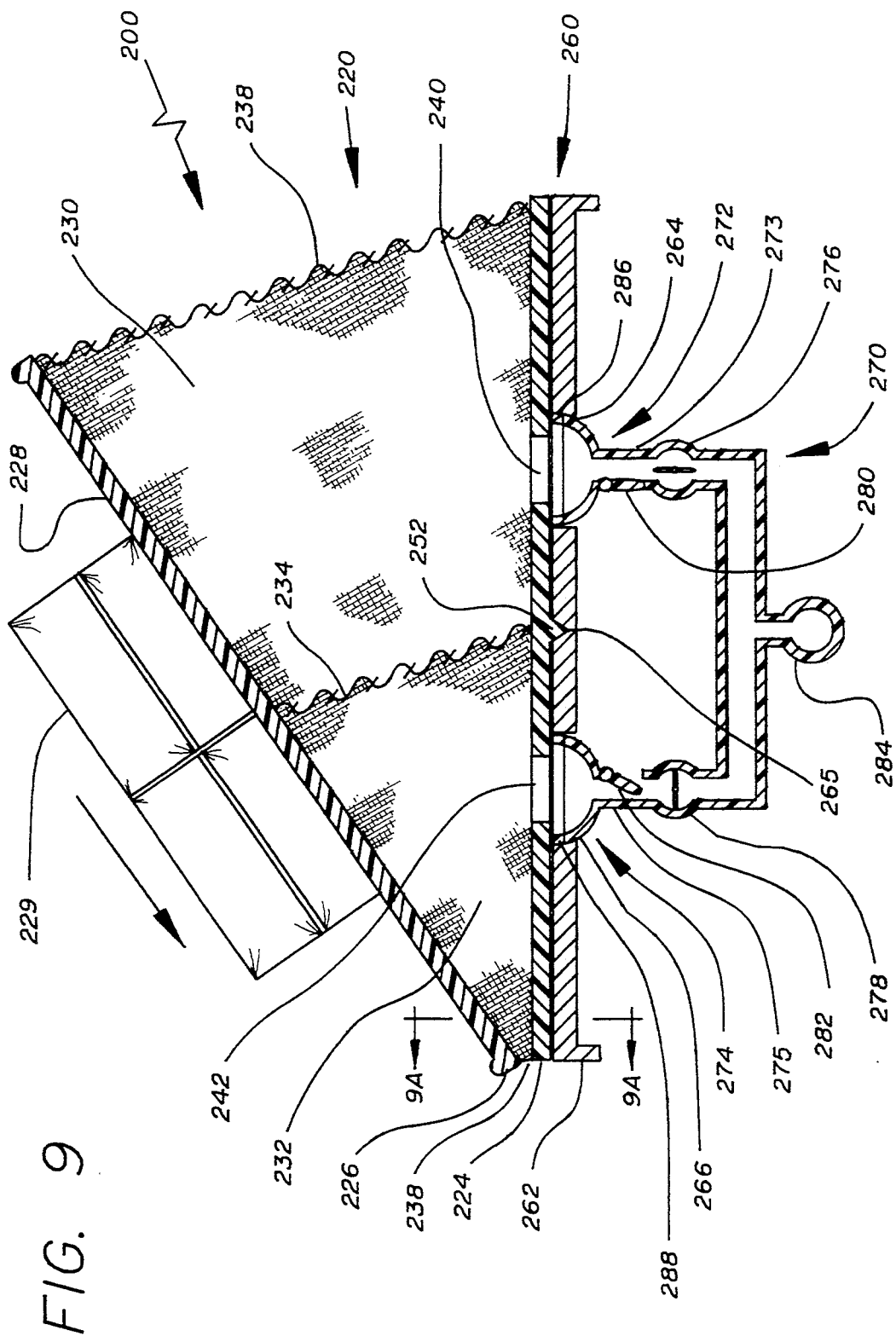
FIG. 9 is a sectional view of a system according to the embodiment of FIG. 8, showing the belt in an inflated position.

With reference to FIGS. 8, 9, and 9A, there will now be described another alternative embodiment of the invention. There is shown in transverse section in FIG. 8 conveying and sorting system 200 according to the invention. Conveying and sorting system 200 includes belt 220 supported on belt support assembly 260, and pressurized fluid or air supply apparatus 270 associated with belt support assembly 260.

Belt 220 is generally a continuous or endless flexible belt. Belt 220 has an upper surface 227. Belt 220 is divided along its length into a large number of sections 222. Each section 222 includes lower surface 224 and upper surface 226. Upper surface 226 comprises supporting surface 228. Supporting surface 228 is a generally planar, rigid member. Supporting surface 228 is disposed across the entire width of belt 220 in the transverse direction. First side membrane 236, central membrane 234, second side membrane 238, and end membranes 239 are provided joining supporting surface 228 and lower surface 224. Each membrane 234, 236, 238, 239 is disposed in a generally vertical orientation, with a lower edge attached to lower surface 224 and an upper edge attached to upper surface 226 or supporting surface 228. First side membrane 236 is disposed generally longitudinally along a first side of belt 220. Central membrane 234 is disposed generally longitudinally along the center of belt 220. Second side membrane 238 is disposed generally longitudinally along a second side of belt 220.

End membranes 239 are disposed generally transversely at each end of each section 222. Each of central membrane 234, first side membrane 236, and second side membrane 238, is attached at each of its ends to one of end membranes 239.

It will be understood that first inflatable chamber 230 is defined by a portion of lower surface 224, a portion of supporting surface 228, central membrane 234, first side membrane 236, and a portion of each of end membranes 239. Similarly, second inflatable chamber 232 is defined by second side membrane 238, central membrane 234, a portion of each end membrane 239, a portion of supporting surface 228, and a portion of lower surface 224. A generally circular first opening 240 is formed in and through lower surface 224 interior to first inflatable chamber 230. A generally circular second opening 242 is formed in and through lower surface 224 interior to second inflatable chamber 232. First opening 240 thus forms an opening in first inflatable chamber 230. Second opening 242 thus forms an opening in second inflatable chamber 232.

An upstanding partition fin 248, disposed transversely across belt 220, is provided between each section 222 and the next section 222. Retaining lips 250, projecting upwardly from each side of supporting surface 228, and disposed in a longitudinal direction, may also be provided. V-tracking projection 252 may be provided depending downward from a lower side of lower surface 224, and extending longitudinally the length of belt 220. In FIG. 8, box 229 is disposed on supporting surface 228.

Belt support assembly 260 will now be described. Belt support assembly 260 comprises a conveyor bed 261. Conveyor bed 261 comprises a normally horizontal, generally planar and generally continuous surface for supporting and guiding belt 220. As with the other embodiments, conveyor belt support assembly 260 preferably comprises a plurality of slider bed sections 262 disposed in end-to-end relation along the length of conveyor belt support assembly 260. Each slider bed section 262 is preferably a generally planar piece of sheet metal or other material having a smooth surface on which belt 220 may ride with a minimum of friction. Each slider bed section 262 is supported on a conventional support apparatus or frame (not shown). Each slider bed section 262 has first opening 264 and second opening 266 defined therein. First opening 264 and second opening 266 are disposed spaced transversely inward from opposite sides of the slider bed section 262. First opening 264 is aligned in a transverse direction with first opening 240. Second opening 262 is aligned in a transverse direction with second opening 242. The diameter of first opening 264 and second opening 266 in slider bed section 262 in the transverse direction is substantially the same as the diameter of first opening 240 and second opening 242 in lower surface 224 of belt 220. The diameter of first opening 264 and second opening 266 in slider bed section 262 in the longitudinal direction is greater than the diameters of first opening 240 and second opening 242. The diameter of openings 264 and 266 in slider bed section 262 may be, for example, in the longitudinal direction, three to four times the diameter of openings 240 and 242 in belt 220. Preferably, between each pair of adjacent slider bed sections 262 there is defined a gap 263. Thus, sets of openings comprising first openings 264 and second openings 266, alternate with gaps 263, all being formed in conveyor bed 261. V-tracking groove 265 is formed longitudinally in conveyor bed 261, aligned in the transverse direction with V-tracking projection 252, and dimensioned to receive V-tracking projection 252.

Pressurized gas or air supply system 270 will now be described. There is provided a pressurized air plenum 284 extending longitudinally beneath conveyor bed 261. There are disposed at selected intervals pairs of ports, each pair of ports comprising a first port 272 and a second port 274. First port 272 is in physical communication with pressurized air plenum 284 through first airway 273 and first solenoid-actuated valve 276. Second port 274 is in physical communication with pressurized air plenum 284 through second airway 275 and second solenoid-actuated valve 278. Each of first port 272 and second port 274 has an elongated upward opening having a diameter in the transverse direction generally equal to the diameter of first opening 240 and second opening 242 in lower wall 224 of belt 220. The diameter of each of first port 272 and second port 274 in the longitudinal direction is greater than the diameter of first opening 240 and second opening 242. This configuration of first port 272 and second port 274 provides physical communication between first port 272 and first inflatable chamber 230, and second port 274 and second inflatable chamber 232, for a desired period of time during the longitudinal motion of belt 220.

There is desirably provided a felt ring 286 on first port 272, and a second felt ring 288 on second port 274. Each felt ring 286, 288, is disposed on a spring-loaded sleeve which is provided about the lip of respective ports 272 and 274. The spring-loaded sleeve causes each felt ring 286, 288 to be biased upward and thereby maintained in physical contact with a lower side of lower surface 224. This tends to provide a seal between first port 272 and second port 274 and lower surface 224. As a result, when air is forced into first inflatable chamber 230 from first port 272, or into second inflatable chamber 232 from second port 274, there will be a small or no gap formed between first port 272 or second port 274, and lower surface 224 and thus a minimum of leakage of pressurized air. Felt rings 286, 288 also minimize wear on the lower side of lower surface 224, thereby providing extended belt life.

There is provided on airway 273, between first port 272 and first valve 276, first one-way relief valve 280. First relief valve 280 is so disposed that it will permit air to enter into airway 273 and, through airway 273, first port 272, but will not permit the exit of air from first port 272. Similarly, there is provided on airway 275, that is, between second port 274 and second solenoid-actuated valve 278, second one-way relief valve 282. Second one-way relief valve 282 is so disposed to permit the entry of air into airway 275 and into second port 274, but not to permit the flow of air from second port 274 to the exterior of the air supply system 270.

Conveying and sorting system 200 operates as follows. Control system 300 of FIG. 10 may be used to control conveying and sorting system 200. However, package displacement display 310 is not necessary. A package is placed anywhere on a selected supporting surface 228. When computer 302 determines that the package is to be discharged to the left side, first valve 276 is opened. Opening of first valve 276 causes pressurized air from air plenum 284 to be permitted to enter into first port 272 and proceed from first port 272 into first inflatable chamber 230. In other words, pressurized air supply apparatus 270 introduces pressurized air between lower surface 224 and supporting surface 228, or between conveyor bed 261 and supporting surface 228. The entry of pressurized air into first inflatable chamber 230 causes an upward pressure to be placed on the lower side of supporting surface 228, thereby forcing supporting surface 228 upward. As supporting surface 228 is forced upward, second inflatable chamber 232 is caused to expand. The expansion of second inflatable chamber 232 causes a low pressure condition to occur within second inflatable chamber 232. As second inflatable chamber 232 is in communication with second port 274, when second port 272 and first port 274 are both aligned in the transverse direction, as are first opening 240 and first opening 242, it will be understood that a low pressure condition occurs in second port 274 and in airway 275. As a result, second one-way relief valve 282 will open to allow atmospheric air to enter into airway 275 and thereby into second port 278 and through opening 242 into second inflatable chamber 232. Second inflatable chamber 232 will thus be able to expand with minimal resistance provided against the motion of supporting surface 228.

Referring to FIG. 9, the position obtained by supporting surface 228 when first inflatable chamber 230 is fully inflated is generally pivoted along an axis parallel to the longitudinal direction and along the left-hand side of belt 220. Supporting surface 228 may be said to be tilted to the left-hand side of section 222 or belt 220. Supporting surface 228 may be constrained to attain this position by providing central membrane 234 having about one-half the vertical height of first side membrane 236. Central membrane 234 is taut when either first inflatable chamber 230 or second inflatable chamber 232 is fully inflated. Thus the line of attachment of central membrane 234 to supporting surface 228 provides a pivot for supporting surface 228. First end membrane 244, and second end membrane 246, may also be provided having a lower height in a center thereof, and a greater height at a side thereof, to constrain the motion of supporting surface 228. Thus, supporting surface 228 is so disposed with respect to first inflatable chamber 230 to be tilted to the left-hand side of belt 220 upon inflation of first inflatable chamber 230. Supporting surface 228 may be tilted, for example, about 30 degrees from horizontal.

It will be understood from FIG. 9 that a package located on supporting surface 228 will be discharged to the left-hand side. As shown, box 229 is moving in the direction of the arrow to the side of supporting surface 228. If it is desired to discharge a package to a right-hand side, then a similar procedure is employed, in which second valve 278 is opened to introduce pressurized air from plenum 284 to second port 274, through second opening 242, and into second inflatable chamber 232. The introduction of pressurized air into second inflatable chamber 232 causes supporting surface 228 to be forced upward, which causes an expansion and, hence, a low-pressure condition in first inflatable chamber 230. As first inflatable chamber 230 and first port 272 are in physical communication, the pressure is quickly equalized between first port 272 and first inflatable chamber 230, by causing a low-pressure condition in first port 272. This causes first one-way relief valve 280 to open to admit atmospheric air into first port 272 and then through first opening 240 into first inflatable chamber 230. This permits supporting surface 228 to be capable of being moved upward without the resistance caused by a low-pressure condition in first inflatable chamber 230. It will be understood that supporting surface 228 attains a position in which it is rotated or tilted about an axis disposed longitudinally along the travel of belt 220, and disposed at a right-hand edge of belt 220. Thus supporting surface 228 is tilted to the right-hand side or edge of belt 220. Supporting surface 228 is disposed with respect to second inflatable chamber 232 to be tilted to the right-hand side of belt 220 upon inflation of second inflatable chamber 232.

The continuing motion of belt 220 brings first opening 240 and second opening 242 over gap 263. Gap 263 causes both inflatable chambers 230, 232 to be provided in physical communication with atmospheric air. Whichever of inflatable chambers 230, 232 was fully inflated quickly deflates. The partially-inflated one of inflatable chambers 230, 232 also deflates simultaneously. Supporting surface 228 accordingly returns from one of its tilted orientations to its normal horizontal position.

The embodiment of FIGS. 8, 9, and 9A is advantageous as it permits the discharge of a package located at any point on supporting surface 228 to either side. Thus, in the apparatus of FIG. 8, there is no need to determine on which side the package must be placed.

There are numerous advantages of the method and apparatus according to the invention over the prior art. The method and apparatus of the invention may be configured to occupy a minimum of floor area. Typically, in an endless belt conveyor system, the return portion of the belt is guided beneath the active article-carrying portion of the belt. By contrast, in systems and methods in the prior art which employed carriages having tiltable article supporting surfaces, a return track, which occupied floor space in addition to that occupied by the article-carrying track, must be provided.

The system and method according to the invention requires a minimum of moving mechanical parts. The only moving mechanical parts in the stationary portion of the apparatus are the air valves. The belt itself, of course, may be easily and inexpensively replaced. For example, the belt may be manufactured in units having a selected number of cells, such as five cells per unit. The installation cost of this system in existing facilities configured for endless belt conveyors should be relatively small. The required changes amount to little more than the providing of a belt according to the invention, a specialized drum for moving the belt, a system for pressurized air supply, and appropriate modifications to the conveyor bed to allow pressurized air to enter, and be exhausted from, the inflatable chambers of the belt. An appropriate electronic control system and an apparatus for supporting the belt on its return can also easily be provided. The noise produced by a system according to the invention is much lower than that produced by a prior art system using carriages. Thus, it will be seen that, in comparison with prior art methods and systems, the method and system of the present invention is simple and inexpensive to install, operate and maintain, is relatively quiet, and occupies a minimum of valuable floor space in sorting facilities.

It will be appreciated that there are considerable variations that can be accomplished in an article, a system and a method of the invention without departing from its scope. As a result, although a number of preferred embodiments of articles, systems and methods according to the invention have been described above, it is emphasized that the invention is not limited to a preferred embodiment and there exists other alternative embodiments that are fully encompassed within the invention's scope, which is intended to be limited only by the scope of the appended claims.

What is claimed is:

1. A conveyor belt, comprising:
   (a) a lower surface; and
   (b) a plurality of article supporting surfaces, each of said article supporting surfaces, being tiltably attached to and normally located upward of said lower surface, wherein a plurality of openings are defined in said belt for receiving pressurized gas between said lower surface and said article supporting surfaces, each of said article supporting surfaces being disposed to tilt upon introduction of pressurized gas in a selected one of said openings.

2. A conveyor belt as recited in claim 1, wherein said belt further comprises a plurality of inflatable chambers, each of said openings being defined in one of said inflatable chambers.

3. A conveyor belt as recited in claim 2, wherein each of said openings is formed in said lower surface.

4. A conveyor belt, comprising:
   (a) a lower surface;.and (b) a plurality of article supporting surfaces, each of said article supporting surfaces being tiltably attached to and normally located upward of said lower surface, wherein said belt comprises a plurality of sections, each of said sections comprising a first one of said article supporting surfaces to a first side of said section, and a second one of said article supporting surfaces to a second side of said section; and wherein each of said sections further comprises a flexible membrane attached to inner edges of each of said first and second ones of said article supporting surfaces.

5. A conveyor belt, comprising:

(a) a lower surface; and (b) a plurality of article supporting surfaces, each of said article supporting surfaces being tiltably attached to and normally located upward of said lower surface;

wherein said belt comprises a plurality of sections, each of said sections comprising a first one of said article supporting surfaces to a first side of said section, and a second one of said article supporting surfaces to a second side of said section; and each of said sections further comprises first and second inflatable chambers between said lower surface and said article supporting surfaces, an opening being defined in each of said inflatable chambers, said first one of said article supporting surfaces being so disposed with respect to said first inflatable chamber as to be tiltable to the first side of said section upon inflation of said first inflatable chamber, and said second one of said article supporting surfaces being so disposed with respect to said second inflatable chamber as to be tiltable to the second side of said section upon inflation of said second inflatable chamber.

6. A conveyor belt as recited in claim 5, wherein said first supporting surface and said second supporting surface each is substantially rigid and comprises a plurality of transversely extending fingers, said fingers of said first and second supporting surfaces alternating to define a central portion, whereby an article disposed on said central portion will be discharged to the first side by inflation of said first inflatable chamber and to the second side by inflation of the second inflatable chamber.

7. A conveyor belt, comprising:

(a) a lower surface;

(b) a plurality of article supporting surfaces, each of said article supporting surfaces being normally located upward of and tiltably attached to said lower surface;

wherein said belt comprises a plurality of sections, each of said sections comprising one of said article supporting surfaces disposed across the width of said section, said one of said article supporting surfaces being substantially rigid; and each of said sections further comprises first and second inflatable chambers between said lower surface and said article supporting surface, said one of said article supporting surfaces being so disposed as to tilt to a first side of said section upon inflation of said second inflatable chamber, and to a second side of said section upon inflation of said first inflatable chamber.

8. A conveyor belt as recited in claim 7, wherein each of said sections further comprises a flexible partition wall substantially longitudinally disposed along the center of said section and attached at an article supporting edge to said upper surface and at a lower edge to said lower surface.

9. An article sorting and conveying system for conveying an article along a predetermined path and discharging the article to a selected one of a plurality of destinations on at least one side of the predetermined path, comprising:

(a) a belt, comprising a lower surface and a plurality of article supporting surfaces normally located upward of and tiltably attached to said lower surface;

(b) means for supporting said belt during motion along the predetermined path; and (c) means for selectively tilting said article supporting surfaces, thereby causing an article on the selectively tilted article supporting surface to be discharged to the selected one of the plurality of destinations;

wherein said tilting means comprises means for selectively introducing pressurized gas between said lower surface and each of said article supporting surfaces.

10. A system as recited in claim 9, wherein said pressurized gas introducing means comprises a plurality of ports, opening generally upward at selected locations in said belt supporting means.

11. A system as recited in claim 10, wherein said belt supporting means comprises a substantially planar surface having formed therein port openings aligned with said ports and a plurality of outlet openings at selected locations intermediate said ports.

12. A system as recited in claim 10, wherein said ports are disposed in a single row, in alignment in the transverse direction.

13. A system as recited in claim 12, wherein said lower surface of said belt has a plurality of apertures defined therein, and the diameter of each of said ports in the longitudinal direction is greater than the diameter of each of said apertures.

14. A system as recited in claim 9, wherein said belt comprises a plurality of sections, each of said sections comprising first and second inflatable chambers, and wherein said pressurized gas introducing means comprises means for selectively introducing pressurized gas in said first or said second inflatable chamber.

15. A system as recited in claim 14, wherein each section of said belt comprises one and only one substantially rigid supporting surface disposed across the transverse width of said belt, said supporting surface being disposed to tilt to a first side of said belt upon inflation of said first chamber, and to tilt to a second side of said belt upon inflation of said second chamber.

16. A system as recited in claim 15, wherein said introducing means further comprises means for selectively introducing atmospheric pressure air into each of said chambers.

17. A system as recited in claim 14, wherein each section of said belt comprises a substantially rigid first supporting surface disposed at a first side of said belt and a substantially rigid second supporting surface disposed at a second opposite side of said belt, each of said supporting surfaces comprising a plurality of transversely extending fingers, said fingers of said first and said second supporting surfaces alternating to define a central portion of said section, said first supporting surface being disposed to tilt by inflation of said first inflatable chamber and said second supporting surface being disposed to tilt by inflation of said second inflatable chamber.

18. A method for sorting an article by conveying the article along a predetermined path and discharging the article to a selected one of a plurality of destinations disposed on at least one side of the predetermined path, comprising the steps of:
  (a) moving a belt in a longitudinal direction along the predetermined path, said belt comprising a lower surface and a plurality of article supporting surfaces normally located upward of and tiltably attached to said lower surface;
  (b) placing an article on at least one of said article supporting surfaces; and
  (c) when the article is disposed adjacent to the preselected destination, tilting one of said article supporting surfaces on which the article is placed about a longitudinal axis by introducing pressurized gas between said tilted article supporting surface and said lower surface, so as to discharge the article from said belt to the preselected destination.

19. A method as recited in claim 18, wherein said step of introducing pressurized gas comprises the step of introducing pressurized gas through a selected one of a plurality of ports opening upward at selected locations in said path under said lower surface.

20. A method as recited in claim 19, wherein said step of introducing pressurized gas comprises the step of providing a plurality of openings in said lower surface.

21. A method as recited in claim 20, wherein said step of introducing pressurized gas further comprises providing said ports having a diameter in the longitudinal direction greater than a diameter in the transverse direction.

22. A method as recited in claim 18, further comprising, after said step of introducing pressurized gas, the step of releasing the pressurized gas from between the tilted supporting surface and said lower surface, thereby causing the tilted supporting surface to return to a horizontal position.

23. A method as recited in claim 18, further comprising the steps of (i) providing a plurality of sections in said belt and (ii) providing first and second inflatable chambers, in each of said sections and wherein said step of introducing comprises the step of selectively introducing pressurized gas into said first or said second inflatable chamber.

24. A method as recited in claim 23, further comprising the step of providing one and only one substantially rigid supporting surface in each section of said belt; said step of tilting comprising the step of introducing pressurized gas in said first inflatable chamber to tilt said article supporting surface to a first side, and the step of introducing pressurized gas in said second inflatable chamber to tilt said article supporting surface to a second side.

25. A method as recited in claim 23, further comprising the step of providing in each section of said belt a substantially rigid first supporting surface disposed at a first side of said belt and a substantially rigid second supporting surface disposed at a second side of said belt, each of said first and second supporting surfaces comprising a plurality of transversely extending fingers, said fingers of said first and second supporting surfaces alternating to define a central portion of said section.

26. An article sorting and conveying system, comprising:
  (a) a substantially horizontal, planar bed;
  (b) an endless belt supported on said bed, said endless belt comprising a normally horizontal upper surface for conveying articles, said upper surface comprising a plurality of article supporting surfaces; and
  (c) means for selectively introducing pressurized gas between said bed and said upper surface for selectively tilting each of said article supporting surfaces with respect to said bed.

27. A system as recited in claim 26, wherein said upper surface comprises a plurality of sections, and comprises, in each of said sections, a generally rigid first supporting surface to a first side of said belt and a generally rigid second supporting surface to a second side of said belt.

28. A system as recited in claim 27, wherein said first and second supporting surfaces each comprises a substantially longitudinal inner edge.

29. A system as recited in claim 27, wherein said pressurized gas introducing means comprises means for introducing pressurized gas at first and second transversely separated locations, and wherein said first supporting surface is tilted by introduction of pressurized gas at said first location, and said second supporting surface is tilted by introduction of pressurized gas at said second location.

30. A system as recited in claim 29, wherein said first supporting surface and said second supporting surface each is substantially rigid and comprises a plurality of transversely extending fingers, said fingers of said first and second supporting surfaces alternating to define a central portion of said upper surface in said section.

31. A system as recited in claim 26, wherein said upper surface comprises, in each of said sections of said belt, a single generally rigid supporting surface, wherein said pressurized gas introducing means comprises means for introducing pressurized gas between said bed and said upper surface at a plurality of first locations for tilting said supporting surfaces to a first side of said belt and means for introducing pressurized gas between said bed and said upper surface at a plurality of second locations for tilting said supporting surfaces to a second side of said belt.

32. A method for conveying and sorting articles, comprising the steps of:
  (a) supporting an endless belt on a substantially horizontal, planar bed, said belt comprising a normally horizontal upper surface, said upper surface comprising a plurality of article supporting surfaces;
  (b) placing an article at a selected location on said upper surface, said article being supported by at least one of said article supporting surfaces; and
  (c) selectively tilting at least one of said selected article support surfaces by introducing pressurized gas between said bed and said upper surface.

33. A method as recited in claim 32, wherein said upper surface comprises a plurality of sections, each of said sections comprising a generally rigid first supporting surface to a first side of said belt and a generally rigid second supporting surface to a second side of said belt.

34. A method as recited in claim 33, wherein said first and second supporting surfaces each comprises a substantially longitudinal inner edge.

35. A method as recited in claim 34, wherein said step of tilting comprises causing each of said first and second supporting surfaces in a selected one of said sections to rotate about a longitudinal axis disposed at an outer edge of the respective one of said surfaces.

36. A method as recited in claim 34, wherein said step of tilting comprises selectively introducing pressurized gas at first locations in said bed for tilting said first supporting surface or at a second location in said bed, transversely separated from said first location, for tilting said second supporting surface.

37. A method as recited in 36, wherein said first supporting surface and said second supporting surface each is substantially rigid, and comprises a plurality of transversely extending fingers, said fingers of said first and second supporting surfaces alternating to define a central portion of said upper surface in said section.

38. A method as recited in claim 32, wherein said upper surface comprises a plurality of generally rigid supporting surfaces, and wherein said step of tilting comprises selectively introducing pressurized gas at one of a plurality of first locations to tilt a selected one of said supporting surfaces to a first side of said belt, and selectively introducing pressurized gas at one of a plurality of second locations, said second locations being transversely translated from said first locations, to tilt a selected one of said supporting surfaces to a second side of said belt.

* * * * *

UNITED STATES PATENT AND TRADEMARK OFFICE
CERTIFICATE OF CORRECTION

PATENT NO. : 5,388,681
DATED : February 14, 1995
INVENTOR(S) : Henri Bonnet

It is certified that error appears in the above-indentified patent and that said Letters Patent is hereby corrected as shown below:

Column 21, line 3, delete "34" and insert therefor --33--.

Signed and Sealed this

Twenty-seventh Day of June, 1995

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,388,681
DATED : February 14, 1995
INVENTOR(S) : Henri Bonnet

It is certified that error appears in the above-indentified patent and that said Letters Patent is hereby corrected as shown below:

Column 18, line 2, delete "article support-" and insert therefor --upper--.

Column 18, line 3, delete "ing".

Column 18, line 3, delete "upper" and insert therefor --article supporting--.

Signed and Sealed this

First Day of August, 1995

Attest:

BRUCE LEHMAN

*Attesting Officer*   *Commissioner of Patents and Trademarks*